United States Patent Office 3,129,245
Patented Apr. 14, 1964

3,129,245
PURIFICATION OF CARBODIIMIDES
Sylvan E. Forman and Clifford A. Erickson, Mercer County, N.J., assignors to FMC Corporation, a corporation of Delaware
No Drawing. Filed May 29, 1961, Ser. No. 113,067
12 Claims. (Cl. 260—551)

This application relates to the purification of carbodiimides. More particularly, it relates to the purification of carbodiimides with an alkali metal hydroxide.

In recent years there has been interest in a class of compounds known as carbodiimides having the formula: R—N=C=N—R' in which R and R' are organic radicals. These compounds have found use as intermediates in the preparation of resins, pharmaceuticals, textile finishes, and dyestuff assistants. Because of their ability to abstract water from the molecular structure of compounds, carbodiimides are also useful as inducing agents for certain chemical reactions.

Carbodiimides are generally prepared from the corresponding substituted thioureas. The most practical method for preparing carbodiimides involves the use of an inexpensive alkali hypohalite solution. The crude product obtained by this method is quite impure, primarily due to the presence of sulfuric-bearing derivatives of the substituted thiourea. Carbodiimides can also be prepared from substituted thiourea using an alkali halite solution in the presence of a catalyst. However, the product of this reaction also contains sulfur-bearing impurities. In recent years, a number of methods have been reported for purifying these products. For example, it has been suggested that purification can be achieved by distilling the crude product in the presence of yellow mercuric oxide, powdered potassium permanganate, or copper wool. It has also been proposed that carbodiimides can be purified by diluting them with methylene chloride, and chilling the solution at $-20°$ C. for 24 hours, followed by filtration and distillation. However, each of these methods is associated with costs and hazards which render them unsuitable for the purification of carbodiimides on a commercial scale. Accordingly, there still remains as need for a safe and inexpensive purification method which can be readily adapted to commercial production.

It is an object of this invention to provide a method for purifying carbodiimides which method can readily be adapted to commercial production.

Another object is to provide a method for improving the recovery of carbodiimides from crude product mixtures.

These and other objects will become apparent from the following description of this invention.

We have discovered that a crude mixture containing a carbodiimide having the formula: R—N=C=N—R' in which R and R' are selected from the group consisting of alkyl radicals containing 1–8 carbon atoms, cycloalkyl radicals containing 6–8 carbon atoms, the phenyl radical, alkaryl radicals containing 6–8 carbon atoms, and aralkyl radicals containing 6–8 atoms and in which the sum of the carbon atoms in R and R' is at least 4, and sulfur-bearing impurities derived from the corresponding substituted thiourea can be readily purified by treating the mixture with a solid alkali metal hydroxide for at least 5 minutes at a temperature of 40–180° C. By this method carbodiimides are readily purified on a commercial scale to a high degree of purity, thus avoiding the high costs and hazards associated with methods proposed heretofore.

Illustrative examples of carbodiimides which are readily recovered and purified in the manner taught herein include aliphatic carbodiimides such as diethyl-, dipropyl-, diisopropyl-, dibutyl-, diisobutyl-, di-sec.-butyl, di-tert.-butyl-, diamyl-, diisoamyl-, dihexyl-, diheptyl-, dioctyl-, di(2-ethylhexyl)-, and di(2-octyl)-; alicyclic carbodiimides such as dicyclohexyl-, di(methylcyclohexyl)-, bis(dimethylcyclohexyl)-, and dihexahydrobenzyl-; aromatic carbodiimides such as diphenyl-, di-o-tolyl-, di-m-tolyl-, di-p-tolyl-, bis(2,3-dimethylphenyl)-, bis(2,4-dimethylphenyl) -, bis(2,5 - dimethylphenyl) -, bis(2,6-dimethylphenyl)-, bis(3,5-dimethylphenyl)-, and di-o-ethylphenyl-; aralkyl carbodiimidies such as dibenzyl-, di-(1-phenylethyl)-, and di(2-phenylethyl)-; mixed carbodiimides such as N,N'-ethylbutyl-, N,N'-butylcyclohexyl-, N,N'-methylphenyl-, N,N'-butylphenyl-, N,N'-cyclohexyltolyl-, and N,N'-tert.-butylbenzyl-, as well as many others.

Carbodiimides are commonly prepared by reacting a substituted thiourea with an aqueous alkali metal hypohalite solution. The substituted thiourea may be prepared in any convenient manner, for example by reacting carbon disulfide with an amine. The hypohalite solution is prepared by reacting chlorine or bromine with an aqueous alkali metal hydroxide solution, thereby forming a mixture of alkali metal hypohalite and excess alkali metal hydroxide. The reaction temperature should not exceed 30° C., and the solution should remain alkaline, or very rapid decomposition of the hypohalite may occur.

The principal reaction is carried out by adding a water-immiscible solvent for the carbodiimide product to the hypohalite solution along with the substituted thiourea, and stirring the mixture for about 4 hours at room temperature. When the stirring is stopped, the medium separates into two phases, and the organic phase is recovered.

The reaction may also be carried out using calcium hypohalite. By this method, finely divided lime is sieved into water and stirred to form a suspension of calcium hydroxide. Chlorine or bromine is then added to the suspension in such amount as to leave an excess of unreacted calcium hydroxide. The solvent and the substituted thiourea are then added, and the mixture is stirred at room temperature for about 4 hours. The pH should be maintained above about 9 to prevent hydration of the product. When the stirring is stopped, the reaction mixture separates into two phases. The organic phase is recovered and filtered to remove suspended solids. The filtrate separates again into two phases, and the organic phase is recovered.

Carbodiimides may also be prepared from substituted thioureas using an alkali metal halite solution, a sodium carbonate alkaline agent, and a cuprous salt catalyst. The process is otherwise substantially identical to the hypohalite process and gives similar crude products.

Any solvent for the carbodiimide product which is water-immiscible and inert toward hypohalite, halite, and hydroxide solutions at moderate temperatures may be used in these reactions. Typical examples of such solvents include aliphatic hydrocarbons such as pentane, hexane, heptane, octane, and kerosene fractions; alicyclic hydrocarbons such as cyclohexane and methylcyclohexane; aromatic hydrocarbons such as benzene, toluene, and xylene; halogenated hydrocarbons such as dichloromethane, chloroform, carbon tetrachloride, 1,2-dichloroethane, 1,1-dichloroethane, propylchloride, and butylbromide; ethers such as diethyl ether, dibutyl ether, and diisopropyl ether and many others. Preferably, the solvent should have a boiling point between 80° and 150° C. and be inert toward hydroxide at its boiling point.

The method of purifying crude carbodiimides disclosed herein is readily carried out by treating a crude mixture containing a carbodiimide and sulfur-bearing impurities derived from the corresponding substituted thiourea at an elevated temperature in the range of about 40–180° C. with a solid alkali metal hydroxide such as sodium, potassium, or lithium hydroxide. Although some purification is achieved at temperatures as low as 40° C., higher temperatures result in the most significant purification. Preferably, the temperature is in the range of about 80–150° C.

The amount of solid hydroxide used in the purification step will depend upon the temperature employed, and the degree of purity desired. Even very small amounts of hydroxide result in some purification. For best results, about 0.1–1.0 mole of solid hydroxide should be present for each mole of carbodiimide.

Although any solid hydroxide having a purity of about 70–100% may be used, preferably the hydroxide is at least about 95% pure. This purity minimizes the introduction of contaminant, particularly water, with the hydroxide. The hydroxide may be in the form of sticks, pellets, powder, or flakes; however, flaked or ground hydroxide is preferred because of the increased surface area.

The duration of the purification step will depend upon the temperature of the treatment and the degree of purity desired. Although contact times as short as about 5 minutes give some improvement in purity, for best results the product should be in contact with the solid hydroxide for 0.5–2 hours.

Purification is suitably accomplished by distilling the crude carbodiimide in the presence of solid hydroxide. Although the distillation may be carried out at atmospheric pressure especially in the case of the lower boiling carbodiimides, it is generally preferred to distill the carbodiimide under reduced pressure, which allows lower temperatures to be employed and avoids decomposition of the product. Kettle temperatures in excess of about 180° C. should be avoided. If a solvent is present during the distillation, it may either boil off before the product is distilled, or in the case of a high boiling solvent, it may remain after the product has been removed.

The purification step may also be carried out by refluxing the crude product mixture containing carbodiimide dissolved in a solvent in the presence of solid hydroxide, and then separating the resulting medium from the solid hydroxide. The separation may be performed by filtration, or by decantation. The product mixture is stripped to remove the solvent by any conventional procedure such as atmospheric distillation, distillation under reduced pressure, or the use of an inert stripping agent. The remaining product mixture is then distilled, and purified carbodiimide is recovered as the condensate.

In some cases it may be objectionable to have solid hydroxide present in the vessel during refluxing or distillation of the crude carbodiimide. An alternative method for carrying out the purification treatment would be to pass the crude carbodiimide through a bed of solid hydroxide for at least 5 minutes at 40–180° C. In a large plant operation, this may actually be the preferred method. This treatment is suitably carried out by passing concentrated liquid carbodiimide, or carbodiimide dissolved in a solvent, through a heat exchanger to provide the required heat, and then through a bed of solid hydroxide, such as a tower packed with the solid hydroxide. The carbodiimide may make a single pass through the tower if the tower has sufficient hold-up time, or it may be continuously cycled for a series of passes through the heat exchanger and the bed of hydroxide. After passing through the tower, the crude carbodiimide is distilled, and purified carbodiimide is recovered as the condensate.

During the distillation of the product, it is usually desirable to take a forecut of about 10% before the product cut, since the first material to distill over is generally somewhat impure. The product cut is generally taken until about 90% of the material has been distilled. Impurities again appear in the distillate as the last portions of the product are distilled over, and thus an aftercut of about 10% should be taken separately. The forecut and the aftercut may then be combined and redistilled.

Further improvement in the purity of the product can be obtained by a combination of the various purification steps. For example, when the purification involves the steps of refluxing in the presence of solid hydroxide, removing the solvent, and distilling the product mixture, the distillation may be carried out in the presence of additional solid hydroxide. When the purification is carried out by passing the product mixture through a bed of solid hydroxide, a combination of steps including two hydroxide treating steps may be used. For example, the product mixture containing carbodiimide dissolved in a solvent may be purified by consecutively passing it through a bed of solid hydroxide, stripping the mixture to remove the solvent, passing the remaining product mixture through a bed of solid hydroxide, distilling the remaining product mixture, and recovering purified carbodiimide as the condensate.

We have also found that the recovery of carbodiimide from a crude product mixture can be improved by treating a freshly prepared crude organic phase product mixture containing the carbodiimide, sulfur-bearing impurities derived from the corresponding substituted thiourea, and a water-immiscible solvent for the carbodiimide with an alkali metal hydroxide at ambient temperature before the purification treatment. It is believed that this pretreatment removes acid-forming impurities and water which tend to decompose the carbodiimide product. The carbodiimide should be pretreated with the hydroxide prior to being stored or subjected to any purification step requiring elevated temperatures.

Although solid hydroxide may be used, the pretreatment is preferably carried out by washing the crude product mixture with an aqueous hydroxide solution, such as by stirring or shaking the liquids together, and then allowing the mixture to separate into two phases. When a hydroxide solution is employed, its concentration should be at least about 25% by weight, in order to stabilize the product within a reasonable length of time. Solutions having a concentration of at least 40% are preferred, since they introduce less water and are more active. At concentrations in excess of 60%, the hydroxide solution becomes viscous-to-solid, and thus, thorough mixing of the carbodiimide product with the hydroxide is not as readily achieved.

The amount of hydroxide added to the product during the pretreatment will depend upon the nature and amount of impurities present in the product. Even very small amounts of hydroxide have some beneficial effect on improving the yield. For best results, at least about 0.1 mole of alkali metal hydroxide should be used per mole of carbodiimide. Of course, large excesses of hydroxide may be used if desired, since the hydroxide may be recovered and reused.

When the carbodiimide is prepared on a commercial scale, it may be preferable to use a scrubbing tower for the pretreating step. This is accomplished by passing the hydroxide solution down through the tower, while the crude carbodiimide solution is passed countercurrently up through the tower. The pretreatment may also be carried out by passing the carbodiimide through a tower containing solid hydroxide.

Although the pretreatment with hydroxide at ambient temperature may be omitted, for maximum recovery and purity, a combination of the pretreatment and the purification step should be employed. Using this procedure, the crude product may be first washed with hydroxide, and then purified by one or more of the procedures involving the use of solid hydroxide at elevated temperatures.

In some cases the crude product may be contaminated with a substituted urea which was produced as an undesirable side-product. If a preliminary test indicates that a significant amount of substituted urea is present, then the urea should be precipitated from the crude product mixture using a solvent such as hexane. The precipitation is suitably carried out, after the reaction solvent has been stripped from the product mixture, by adding hexane to the residue, cooling the mixture, and filtering off the solids. The hexane is then removed by stripping under reduced pressure. When hexane is used as the reaction solvent in the preparation of the carbodiimide product, the substituted urea precipitates as it is formed.

The following examples, illustrating the novel methods disclosed herein for recovering and purifying carbodiimides, are presented without any intention that the invention be limited thereto. The purities reported in these examples were determined by gas phase chromatography; the sulfur contents were determined by bombing the sample with oxygen and measuring the resulting sulfate gravimetrically, and the congealing points were measured by immersing a thermometer in a molten sample and allowing it to cool in air. All percentages are by weight.

*Example 1*

Dicyclohexylcarbodiimide was prepared as follows: Chlorine was bubbled into a suspension of 600 grams of $Ca(OH)_2$ in 3 liters of water, while stirring and cooling to 15–20° C., until the weight gain was 390 grams. The resulting solution contained 5.5 moles of $Ca(ClO)_2$ and had a pH of 11.6. One and five-tenths liters of toluene were then added to the $Ca(ClO)_2$ solution, followed by 240 grams of fine crystalline N,N'-dicyclohexylthiourea, and the mixture was stirred at 25° C. for 4 hours. This reaction was slightly exothermic and had to be cooled. When the stirring was stopped, the reaction mixture separated into two layers. The pH of the aqueous layer was 11.0. The organic layer was filtered to remove about 20 grams of suspended solids, and separated from about 100 milliliters of water in the filtrate. The organic layer comprising an impure solution of dicyclohexylcarbodiimide in toluene was divided into 3 equal portions.

The first equal portion of the organic layer was washed with 35 milliliters of 50% aqueous NaOH solution, stripped of toluene under vacuum, and distilled from 5 grams of 97% flake NaOH. After a small forecut had been removed, the main product cut, distilling at 99–100° C. at 0.1 mm. Hg, was collected. This main cut had a congealing point of 33.5° C., was 97.8% pure, and had a sulfur content of 0.16%.

The second equal portion of the organic layer was washed with 35 milliliters of 50% aqueous NaOH solution, and distilled under vacuum without controlled reflux. After the solvent distilled off, 4 similar fractions distilling at 90–93° C. at 0.1 mm. Hg. These fractions had congealing points of 20–31° C., purities of 94.9–97.1%, sulfur contents of 0.78–2.3%, and constituted 80% of the theoretical yield.

The third equal portion of the organic layer containing dicyclohexylcarbodiimide dissolved in toluene was distilled at a reflux ratio of 20:1 without being previously washed with NaOH. After the solvent distilled off, four light brown fractions, which distilled at 100° C. at 0.15 mm. Hg, were obtained. These fractions assayed 92.4–97.2%, contained 0.81–1.7% sulfur, had congealing points of 20–29° C., and constituted 68% of the theoretical yield.

This example shows that improvement in the quality of the product can be achieved by distilling from solid NaOH, that purifacation is not readily achieved by rectification, and that pretreating the crude product solution with NaOH at room temperature results in a substantial increase in recovered product.

*Example 2*

Dicyclohexylcarbodiimide was prepared as follows: Three hundred fifty-five grams of $Cl_2$ were bubbled into a stirred solution of 480 grams of NaOH in 2 liters of water, while the temperature was held below 25° C. The resulting solution contained 5 moles of NaClO and 2 moles of NaOH. One liter of methylcyclohexane, as solvent, was added to the NaClO solution followed by 240 grams of N,N'-dicyclohexylthiourea. The mixture was stirred for 4 hours at 25° C., after which it was allowed to separate into 2 layers.

The solvent layer was recovered and washed with 100 milliliters of 55% aqueous NaOH solution. Five hundred milliliters of the resulting solution of crude dicyclohexylcarbodiimide in methylcyclohexane were refluxed for 1 hour with 10 grams of ground 85% KOH. The solid was filtered off, and the filtrate was stripped of solvent by vacuum distillation. After removing 11 grams of impure material as a forecut, further vacuum distillation of the crude product mixture gave a product cut boiling at 97–103° C. at 0.1 mm. Hg and consisting of 72 grams of dicyclohexylcarbodiimide having a congealing point at 30.5° C., an assay of 94.3%, and a sulfur content of 0.09%.

This example shows that KOH can be used in the purification step.

*Example 3*

Crude dicyclohexylcarbodiimide dissolved in toluene was prepared in the manner set forth in Example 1. The toluene layer was washed with 100 milliliters of 50% aqueous NaOH solution, refluxed for 1 hour with 15 grams of 97% flake NaOH, cooled, filtered, stripped of toluene under vacuum, and distilled. The major fraction distilled at 96–100° C. at 0.1 mm. Hg, and had a congealing point of 34° C., a slightly yellow color, an assay of 97.8%, and 0.04% sulfur content.

This example shows that refluxing of the toluene layer with solid NaOH results in a substantially pure product except for some color.

*Example 4*

Crude dicyclohexylcarbodiimide dissolved in toluene was prepared and washed following the procedure set forth in Example 1. The solvent layer was stripped under vacuum to remove the toluene, and the concentrated product mixture was continuously cycled at about 100° C. through a heat exchanger and up through a vessel packed with 97% flake NaOH for about 1 hour. The product mixture was then distilled under vacuum, and after a small forecut, a product cut was obtained having a congealing point at 33.5° C., an assay of 98.1%, a sulfur content of 0.03%, and a white color.

This example shows that the purification step can be carried out by passing the crude product through a bed of solid NaOH.

*Example 5*

Crude dicyclohexylcarbodiimide dissolved in toluene was prepared in the manner set forth in Example 1. The organic layer was washed with 100 milliliters of 45% aqueous NaOH solution, and refluxed with 30 grams of 97% flake NaOH for 1 hour. The solution was cooled, filtered to remove the solids, and stripped under reduced pressure to remove the toluene. The crude product was distilled in the presence of 15 grams of 97% flake NaOH. The main fraction consisted of a white product distilling at 105–106° C. at 0.2 mm. Hg, and having a congealing point of 34° C., an assay of 98.4%, and a sulfur content of 0.06%.

This example shows that a product of exceptional purity can be obtained by refluxing in the presence of solid NaOH followed by distillation from additional solid NaOH.

*Example 6*

Samples of foreruns from a number of distillations of crude dicyclohexylcarbodiimide were combined. This composite was a yellow liquid congealing at about 5° C., assaying at 92.1% and containing 1.79% sulfur. Fifty grams of this material were distilled under vacuum from 10 grams of 97% flake NaOH. After removing a small forerun, which was liquid at −20° C., had an assay of 39.5%, and contained 13.15% sulfur, the main fraction, which distilled at 90–94° C. at 0.1 mm. Hg, was collected. This fraction had a white color, a congealing point of 33° C., an assay of 97.1%, and a sulfur content of 0.02%.

This example indicates that very impure samples of dicyclohexylcarbodiimide can be purified by distillation from solid NaOH.

*Example 7*

Diisopropylcarbodiimide was prepared by dissolving 181 grams of NaClO$_2$ and 148 grams of Na$_2$CO$_3$ in 1 liter of water. To this solution were added 600 milliliters of toluene, 160 grams of N,N'-diisopropylthiourea, and 10 grams of Cu$_2$Cl$_2$ as catalyst. The mixture was stirred for 4 hours at 25° C. after which it was allowed to separate into layers. The toluene layer was recovered and divided into 2 equal portions.

One portion of the toluene layer was washed with 20 milliliters of 50% aqueous NaOH solution, the layers were separated, and the organic layer was heated with 5 grams of flake NaOH at 80° C. for 1 hour. The liquid phase was decanted from the solids and then distilled from 5 grams of fresh flake NaOH. After a small forecut, 51 grams of diisopropylcarbodiimide, distilling at 79° C. at 65 mm. Hg and containing 0.06% sulfur, were obtained.

For comparsion, the other portion of the toluene layer was dried with MgSO$_4$ and distilled to give 48 grams of product boiling at 79° C. at 65 mm. Hg and containing 1.2% sulfur.

*Example 8*

Dibutylcarbodiimide was prepared by dissolving 373 grams of NaClO and 80 grams of NaOH in 2 liters of water. To this solution were added 1 liter of toluene and 188 grams of N,N'-di-n-butylthiourea. The mixture was stirred for 4 hours at 25° C., after which the medium was allowed to separate into layers. The toluene layer was recovered and divided into 2 equal portions.

One portion of the toluene layer was washed with 20 milliliters of 50% aqueous NaOH solution. The layers were separated and the organic layer was heated with 5 grams of flake NaOH at 80° C for 1 hour. The liquid phase was decanted from the solids and distilled from 5 grams of fresh NaOH flakes. After a small forecut, 68 grams of dibutylcarbodiimide, distilling at 85° C. at 10 mm. Hg and containing 0.07% sulfur, were obtained.

For comparison, the other portion of the toluene layer was dried with MgSO$_4$ and distilled to give 65 grams of product boiling at 84° C. at 10 mm. Hg and containing 2.3% sulfur.

*Example 9*

Di-tert.-butylcarbodiimide was prepared by dissolving 373 grams of NaClO and 80 grams of NaOH in 2 liters of water. To this solution were added 1 liter of toluene and 188 grams of N,N'-di-tert.-butylthiourea. The mixture was stirred for 4 hours at 25° C. after which the medium was allowed to separate into layers. The toluene was recovered and divided into 2 equal portions.

One portion was washed with 20 milliliters of 50% aqueous NaOH solution. The layers were separated and the organic layer was heated with 5 grams of flake NaOH at 80° C. for 1 hour. The liquid phase was decanted from the solids and distilled from 5 grams of fresh NaOH flakes. After a small forecut, 73 grams of di-tert.-butylcarbodiimide, distilling at 81° C. at 40 mm. Hg and containing 0.03% sulfur, were obtained.

For comparison, the other portion of the toluene layer was dried with MgSO$_4$ and distilled to give 70 grams of product boiling at 81° C. at 40 mm. Hg and containing 0.8% sulfur.

*Example 10*

N,N'-butylphenylcarbodiimide was prepared by dissolving 186 grams of NaClO and 40 grams of NaOH in 1 liter of water. To this solution were added 500 milliliters of toluene and 104 grams of N,N'-n-butylphenylthiourea. The mixture was stirred for 4 hours at 25° C., after which the medium was allowed to separate into layers. The toluene layer was recovered and washed with 20 milliliters of 50% aqueous NaOH solution. The layers were separated and the organic layer was heated with 5 grams of flake NaOH at 80° C. for 1 hour. The liquid phase was decanted from the solids and distilled from 5 grams of fresh NaOH flakes. After a small forecut, 60 grams of N,N'-butylphenylcarbodiimide, distilling at about 55° C. at 0.001 mm. Hg and containing 0.04% sulfur, were obtained.

*Example 11*

Diphenylcarbodiimide was prepared by dissolving 186 grams of NaClO and 40 grams of NaOH in 1 liter of water. To this solution were added 500 milliliters of toluene and 114 grams of N,N'-diphenylthiourea. The mixture was stirred for 4 hours at 25° C., after which the medium was allowed to separate into layers. The toluene layer was recovered and washed with 20 milliliters of 50% aqueous NaOH solution. The layers were separated and the organic layer was heated with 5 grams of flake NaOH at 80° C. for 1 hour. The liquid phase was decanted from the solids and distilled from 5 grams of fresh NaOH flakes. After a small forecut, 68 grams of diphenylcarbodiimide, distilling at about 165° C. at 10 mm. Hg and containing 0.08% sulfur, were obtained.

While the recovery and purification methods of this invention have been described and exemplified in such manner that one skilled in the art can readily understand and practice the invention, numerous modifications and variations of the embodiments illustrated above may be made without departing from the spirit of the invention or the scope of the following claims.

We claim:

1. The method of purifying a crude mixture containing a carbodiimide having the formula:

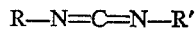

in which R and R' are selected from the group consisting of alkyls of 1–8 carbon atoms, cycloalkyls of 6–8 carbon atoms, phenyl, carbocyclic alkaryls of 7–8 carbon atoms, and carbocyclic aralkyls of 7–8 carbon atoms and in which the sum of the carbon atoms in R and R' is at least 4, and sulfur-bearing impurities derived from the corresponding substituted thiourea which comprises treating said mixture with a solid alkali metal hydroxide for at least 5 minutes at a temperature of 40–180° C., and recovering the purified carbodiimide.

2. The method of purifying a crude mixture containing a carbodiimide having the formula:

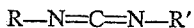

in which R and R' are selected from the group consisting of alkyls of 1–8 carbon atoms, cycloalkyls of 6–8 carbon atoms, phenyl, carbocyclic alkaryls of 7–8 carbon atoms, and carbocyclic aralkyls of 7–8 carbon atoms and in which the sum of the carbon atoms in R and R' is at least 4, and sulfur-bearing impurities derived from the corresponding substituted thiourea which comprises distilling said mixture in the presence of at least 0.1 mole of solid sodium hydroxide per mole of carbodiimide, and recovering the purified carbodiimide as the condensate.

3. The method of purifying a crude mixture containing a carbodiimide having the formula:

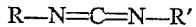

in which R and R' are selected from the group consisting of alkyls of 1–8 carbon atoms, cycloalkyls of 6–8 carbon atoms, phenyl, carbocyclic alkaryls of 7–8 carbon atoms, and carbocyclic aralkyls of 7–8 carbon atoms and in which the sum of the carbon atoms in R and R' is at least 4, and sulfur-bearing impurities derived from the corresponding substituted thiourea which comprises passing said mixture through a bed of solid sodium hydroxide for 0.5–2 hours at a temperature of 80–150° C., distilling said mixture, and recovering the purified carbodiimide as the condensate.

4. The method of purifying a crude product mixture containing a carbodiimide having the formula:

R—N=C=N—R' in which R and R' are selected from the group consisting of alkyls of 1–8 carbon atoms, cycloalkyls of 6–8 carbon atoms, phenyl, carbocyclic alkaryls of 7–8 carbon atoms, and carbocyclic aralkyls of 7–8 carbon atoms and in which the sum of the carbon atoms in R and R' is at least 4, sulfur-bearing impurities derived from the corresponding substituted thiourea, and a water-immiscible solvent for the carbodiimide boiling between 80° and 150° C. which comprises heating said product mixture at a temperature of 80–150° C. for 0.5–2 hours in the presence of at least 0.1 mole of solid sodium hydroxide per mole of carbodiimide, separating said product mixture from said hydroxide, stripping the solvent from said product mixture, distilling the remaining product mixture, and recovering the purified carbodiimide as the condensate.

5. The process of claim 4 in which the distillation of said remaining product mixture is carried out in the presence of additional solid sodium hydroxide.

6. The method of improving the recovery of carbodiimide from a freshly prepared crude organic phase product mixture containing a carbodiimide having the formula: R—N=C=N—R' in which R and R' are selected from the group consisting of alkyls of 1–8 carbon atoms, cycloalkyls of 6–8 carbon atoms, phenyl, carbocyclic alkaryls of 7–8 carbon atoms, and carbocyclic aralkyls of 7–8 carbon atoms and in which the sum of the carbon atoms in R and R' is at least 4, sulfur-bearing impurities derived from the corresponding substituted thiourea, and a water-immiscible solvent for the carbodiimide which comprises contacting said product mixture with an alkali metal hydroxide having a concentration of at least 25%, and recovering the carbodiimide.

7. The method of improving the recovery of carbodiimide from a freshly prepared crude organic phase product mixture containing a carbodiimide having the formula: R—N=C=N—R' in which R and R' are selected from the group consisting of alkyls of 1–8 carbon atoms, cycloalkyls of 6–8 carbon atoms, phenyl, carbocyclic alkaryls of 7–8 carbon atoms, and carbocyclic aralkyls of 7–8 carbon atoms and in which the sum of the carbon atoms in R and R' is at least 4, and sulfur-bearing impurities derived from the corresponding substituted thiourea, and a water-immiscible solvent for the carbodiimide which comprises washing said product mixture with at least 0.1 mole of 40–60% aqueous sodium hydroxide per mole of carbodiimide, and recovering the carbodiimide.

8. The method of recovering and purifying a freshly prepared crude organic phase product mixture containing dicyclohexylcarbodiimide, sulfur-bearing impurities derived from dicyclohexylthiourea, and a water-immiscible solvent for dicyclohexylcarbodiimide boiling between 80° and 150° C. which comprises washing said product mixture with at least 0.1 mole of 40–60% aqueous sodium hydroxide per mole of dicyclohexylcarbodiimide, allowing the medium to separate into phases, separating the phases, stripping the solvent from the organic phase under reduced pressure, distilling the remaining product mixture under reduced pressure in the presence of at least 0.1 mole of solid sodium hydroxide per mole of dicyclohexylcarbodiimide, and recovering purified dicyclohexylcarbodiimide as the condensate.

9. The method of recovering and purifying a freshly prepared crude organic phase product mixture containing dicyclohexylcarbodiimide, sulfur-bearing impurities derived from dicyclohexylthiourea, and a water-immiscible solvent for dicyclohexylcarbodiimide boiling between 80° and 150° C. which comprises washing said product mixture with at least 0.1 mole of 40–60% aqueous sodium hydroxide per mole of dicyclohexylcarbodiimide, allowing the medium to separate into phases, separating the phases, stripping the solvent from the organic phase under reduced pressure, passing the remaining product mixture through a bed of solid sodium hydroxide for 0.5–2 hours at a temperature of 80–150° C., distilling said remaining product mixture under reduced pressure, and recovering purified dicyclohexylcarbodiimide as the condensate.

10. The method of recovering and purifying a freshly prepared crude organic phase product mixture containing dicyclohexylcarbodiimide, sulfur-bearing impurities derived from dicyclohexylthiourea, and a water-immiscible solvent for dicyclohexylcarbodiimide boiling between 80° and 150° C. which comprises washing said product mixture with at least 0.1 mole of 40–60% aqueous sodium hydroxide per mole of dicyclohexylcarbodiimide, allowing the medium to separate into phases, refluxing the organic phase for 0.5–2 hours in the presence of at least 0.1 mole of solid sodium hydroxide per mole of dicyclohexylcarbodiimide, separating the organic phase from said hydroxide, stripping the solvent from the organic phase under reduced pressure, distilling the remaining product mixture under reduced pressure, and recovering purified dicyclohexylcarbodiimide as the condensate.

11. The method of claim 10 in which the distillation of said remaining product mixture is carried out in the presence of additional solid sodium hydroxide.

12. The method of recovering and purifying a freshly prepared crude organic phase product mixture containing dicyclohexylcarbodiimide, sulfur-bearing impurities derived from dicyclohexylthiourea, and a water-immiscible solvent for dicyclohexylcarbodiimide boiling between 80° and 150° C. which comprises washing said product mixture with at least 0.1 mole of 40–60% aqueous sodium hydroxide per mole of dicyclohexylcarbodiimide, allowing the medium to separate into phases, passing the organic phase through a bed of solid sodium hydroxide for 0.5–2 hours at a temperature of 80–150° C., stripping the solvent from the organic phase under reduced pressure, passing the remaining product mixture through a bed of solid sodium hydroxide for 0.5–2 hours at a temperature of 80–150° C., distilling said remaining product mixture under reduced pressure, and recovering purified dicyclohexylcarbodiimide as the condensate.

References Cited in the file of this patent

UNITED STATES PATENTS

| | | |
|---|---|---|
| 2,656,383 | Schmidt et al. | Oct. 20, 1953 |
| 2,946,819 | Coles | July 26, 1960 |
| 3,007,966 | Huey | Nov. 7, 1961 |